(12) United States Patent
Yamamoto (10) Patent No.: US 9,225,871 B2
(45) Date of Patent: Dec. 29, 2015

(54) DATA STORAGE APPARATUS AND DATA STORAGE METHOD

(71) Applicant: KYOCERA Document Solutions Inc., Osaka (JP)

(72) Inventor: Masakazu Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/607,071

(22) Filed: Jan. 27, 2015

(65) Prior Publication Data

US 2015/0222778 A1    Aug. 6, 2015

(30) Foreign Application Priority Data

Jan. 31, 2014    (JP) ................................ 2014-016485

(51) Int. Cl.
*G06K 15/00* (2006.01)
*H04N 1/21* (2006.01)

(52) U.S. Cl.
CPC .......... *H04N 1/21* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,076,151 A * | 6/2000 | Meier | ........................... | 711/171 |
| 6,256,645 B1 * | 7/2001 | Mundy | | |
| 7,107,427 B2 * | 9/2006 | Nakano et al. | ................ | 711/170 |
| 8,612,990 B1 * | 12/2013 | Greenfield et al. | ........... | 718/105 |
| 8,972,690 B2 * | 3/2015 | Horn et al. | .................... | 711/170 |
| 9,052,826 B2 * | 6/2015 | Quan et al. | | |
| 2003/0188120 A1 * | 10/2003 | Maeda | ........................... | 711/170 |
| 2008/0239374 A1 | 10/2008 | Yamaguchi et al. | ......... | 358/1.15 |
| 2009/0153308 A1 * | 6/2009 | Park et al. | ................... | 340/10.51 |
| 2010/0042801 A1 * | 2/2010 | Lee et al. | ...................... | 711/171 |
| 2010/0332785 A1 * | 12/2010 | Huang | ........................... | 711/171 |
| 2011/0167239 A1 * | 7/2011 | Horn et al. | .................... | 711/171 |

FOREIGN PATENT DOCUMENTS

| | | |
|---|---|---|
| JP | 2007-241595 A | 9/2007 |
| JP | 2008-242668 A | 10/2008 |
| JP | 2013-509658 A | 3/2013 |
| WO | WO 2011-059837 A1 | 5/2011 |

\* cited by examiner

*Primary Examiner* — Dung Tran
(74) *Attorney, Agent, or Firm* — Stein IP, LLC (57) ABSTRACT

The use history recording unit records a history of use of a memory area of a user as a state of use whenever the user stores data. The use frequency calculation unit calculates a use frequency of the memory area for every user based on the state of use of the memory area of the user. The remained capacity allocation unit allocates the remained memory capacity in proportion to the use frequency.

5 Claims, 6 Drawing Sheets

|  | USER A | USER B | USER C | TOTAL |
|---|---|---|---|---|
| STORED DATA VOLUME | 10GB | 15GB | 5GB | → 30GB |
| WRITING TIMES | 50 | 150 | 40 | → 240 |
| READING TIMES | 10 | 100 | 20 | → 130 |
| REFERENCE TIMES | 2 | 5 | 1 | → 8 |

FIG. 6B

|  | USER A | USER B | USER C | TOTAL |
|---|---|---|---|---|
| PROPORTION OF STORED DATA VOLUME (%) | 33% | 50% | 17% | |
| PROPORTION OF WRITING TIMES (%) | 21% | 62% | 17% | |
| PROPORTION OF READING TIMES (%) | 8% | 77% | 15% | |
| PROPORTION OF REFERENCE TIMES (%) | 25% | 63% | 12% | |
| TOTAL OF PROPORTIONS (%) | 87% | 252% | 61% | → 400% |
| USE STATE (%) | 22% | 63% | 15% | |
| REMAINED VOLUME OF MEMORY SPACE (GB) | 20GB | 5GB | 15GB | → 40GB |
| UPDATED REMAINED VOLUME (GB) | 9GB | 25GB | 6GB | |

DATA STORAGE APPARATUS AND DATA STORAGE METHOD

CROSS-REFERENCE TO RELATED APPLICATIONS

This application claims the benefit of Japanese Application No. 2014-016485, filed Jan. 31, 2015, all of which is hereby incorporated by reference in its entity.

BACKGROUND OF THE INVENTION

This disclosure relates to data storage apparatus and data storage method.

As image data to be processed by an image processor like multifunction peripherals, various kinds of data exist, such as data in a terminal device connected with the image processor via network, data read by an image reader such as a scanner, and data received via facsimile transmission.

The image data is not always referenced or outputted as soon as the image data is inputted in the image processor. There is a possibility that the data is stored in a memory device provided to the image processor, such as a hard disk. The image data stored in the memory device is to be referenced or outputted by a user according to his purpose at his desired time.

Although a capacity of the memory device in the image processor increases year after year, the capacity of the memory device has a limit. Generally, the storing of the image data is often limited by a condition with respect to a storage period of the image data to be stored or a maximum capacity of the memory device. Since the condition can be set freely by a user, the image data can be stored within an available capacity of the memory device, but the user, that has first stored the image data in the memory device, gains a profit. Accordingly, when plural users are sharing the memory device, there is a problem whether or not the capacity of the memory device can be allocated to each user effectively.

There are many kinds of conventional techniques with respect to the allocation of the memory capacity. For instance, it is known that the document management apparatus includes a user information storage unit for storing information about users, a document file storage unit for storing a document file, and a storage capacity setting unit for setting a user available storage capacity in the document file storage unit for every user stored in the user information storage unit. In the apparatus, the storage memory setting unit is configured to set the user available storage capacity within a range of the remained capacity of the document file storage unit. According to the above configuration, the user can easily operate the setting of the user available storage capacity in the memory that the user is allowed to use, and the user available storage capacity can be limited certainly. In addition, it is sure that the user can store the document file in the memory to the user available storage capacity.

In addition, an image processor wherein a storage area is disposed for every user is known. The image processor includes a calculation unit for calculating a total of a size of a second user's storage area used by a first user and a size of the first user's storage area used by the second user, and a determination unit for determining whether or not the total is more than a specific size. When it is determined that the total is more than the specific size, if the storage area for the first user and the storage area for the second user are in different image processors, a resetting unit resets the first user's storage area and the second user's storage area in a same image processor.

According to this configuration, it is possible to reduce the communication traffic in the network system.

Moreover, it is known that a storage memory allocation method includes steps of receiving a request for storage memory allocation for a file of a current size; estimating a future size of the file, different than the current size of the file, based on at least on a specific attribute associated with the file; and causing allocation of storage memory space for storage of the file based on the future size of the file. The method can realize the allocation of storage memory space for the file based on the estimated future size of the file.

In the above technique, however, the frequency of use of the memory by each user is not considered. There is a problem that it is not clear whether or not the memory capacity can be allocated effectively.

SUMMARY OF THE INVENTION

According to one aspect of the present invention, a data storage apparatus having a memory shared by plural users includes a use history recording unit, a use frequency calculation unit, and a remained capacity allocation unit.

The use history recording unit records a history of use of a memory area of a user as a state of use whenever the user stores data. The use frequency calculation unit calculates a use frequency of the memory area for every user based on the state of use of the memory area of the user. The remained capacity allocation unit allocates the remained memory capacity in proportion to the use frequency.

According to another aspect of the present invention, a data storage method for data storage apparatus having a memory shared by plural users including a use history recording step, a use frequency calculation step, and a remained capacity allocation unit.

The use history recording step records a history of use of a memory area of a user as a state of use whenever the user stores data. The use frequency calculation step calculates a use frequency of the memory area for every user based on the state of use of the memory area of the user. The remained capacity allocation step allocates the remained memory capacity in proportion to the use frequency.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

With reference to attached drawings, a data storage apparatus in the present disclosure are explained according to undermentioned embodiment, in order to understand the present disclosure. Besides, the following embodiments are only examples that realize the present disclosure, and do not limit the technical scope of the present disclosure. Additionally, in the flowchart, the alphabet "S" in front of a numeral means a "step".

<Data Storage Apparatus>

The data storage apparatus in the embodiment of the present disclosure is a general image forming apparatus for image data, which is explained hereinafter. The parts that do not have direct relation to the present disclosure are explained briefly, and the detailed explanation is omitted.

The image forming apparatus in the present disclosure corresponds to a printer or a scanner, or a multifunction peripheral provided with a printer, a copier, a scanner, and facsimile machine. The multifunction peripheral functions as the image forming apparatus provided with a copy function, a scanner function, a facsimile function and a printer function.

Figure 1:
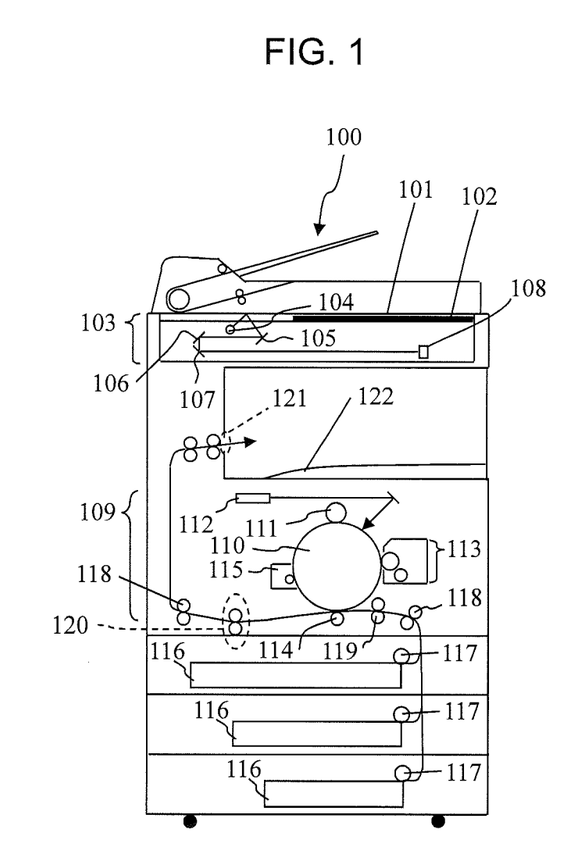
FIG. 1 is a conceptual diagram indicating a whole of an internal structure of a multifunction peripheral in accordance with an embodiment of the present disclosure.

When a user uses the copy function of the multifunction peripheral (MFP) 100, the operation is explained briefly as shown in FIG. 1.

When the user uses the multifunction peripheral 100, the user puts an original P on an original plate 101 on a top of housing. And the user inputs setting conditions (a paper size, a destination, or the like) for the image processing from an initial screen (an operation screen) of an operation unit 102 (an operation panel) nearby the original plate 101. In addition, the user selects the copy function corresponding to the image forming, and presses down a start key on the operation unit 102, whereby the multifunction peripheral 100 starts the image processing (the print processing).

Next, in an image reading unit 103, the light emitted from a light source 104 is reflected on the original placed on the original plate 101. The reflected light is guided to an imaging element 108 by mirrors 105, 106 and 107. After the guided light is photo-electrically converted by the imaging element 108, image data corresponding to the original is formed.

A unit for forming a toner image according to the image data is an image forming unit 109. The image forming unit 109 is provided with a photosensitive drum 110. The photosensitive drum 110 rotates in a predetermined direction at a fixed speed. A charging unit 111, an exposing unit 112, a developing unit 113, a transfer unit 114, and a cleaning unit 115 are arranged around the photosensitive drum 110 in order from the upstream side of the rotation direction.

The charging unit 111 electrifies a surface of the photosensitive drum 110 uniformly. The exposing unit 112 irradiates the laser on the surface of the electrified photosensitive drum 110 based on the image data, and forms an electrostatic latent image. The developing unit 113 sticks the toner on the formed electrostatic latent image, and forms a toner image. The formed toner image is transferred to a recording medium (e.g. a paper or a sheet) by the transfer unit 114. The cleaning unit 115 removes excessive toners remained on the surface of the photosensitive drum 110. The series of processing is executed whenever the photosensitive drum rotates.

The sheet is supplied from one of a polarity of sheet feed cassettes 116 provided to the multifunction peripheral 100. When the sheet is conveyed, the sheet is pulled out from one of the sheet feed cassettes 116 to a conveyance path by a pickup roller 117. Each sheet feed cassette 116 houses a different kind of sheet, respectively. The sheet is supplied based on the setting conditions for the image processing.

The sheet pulled out to the conveyance path is sent between the photosensitive drum 110 and the transfer unit 114 by a conveyance roller 118 and a resist roller 119. On the conveyed sheet, the toner image is transferred by the transfer unit 114, and then the sheet is conveyed to a fixing unit 120.

When the sheet on which the toner image is transferred is passing between a heat roller and a pressure roller, which are provided to the fixing unit 120, a visible image corresponding to the toner image is fixed on the sheet by applying the heat and pressure on the toner image. The quantity of heat of the heat roller is predetermined optimally depending on the kind of sheet, and the fixing is executed appropriately. When the visible image is fixed on the sheet, the image forming process is finished. The sheet is ejected to a tray 122 built in the housing through a sheet exit 121 by the conveyance roller 118. The sheet is loaded on and stored in the built-in tray 122. The multifunction peripheral 100 can give the user the copy function by the above steps.

Besides, it is assumed that the image data described above is data created by the image reading unit 103, but the data to be stored in the multifunction peripheral 100 is not limited in particular, it may be data transmitted from a terminal device or a facsimile machine that are connected to communicate with the multifunction peripheral 100. The image data is stored in a storage unit of the multifunction peripheral 100 for every user, and the data can be used and deleted according to the user's instruction. At the allocation of the memory space in the memory unit, the multifunction peripheral 100 functions as the data storage apparatus (which will be described later).

Figure 2:
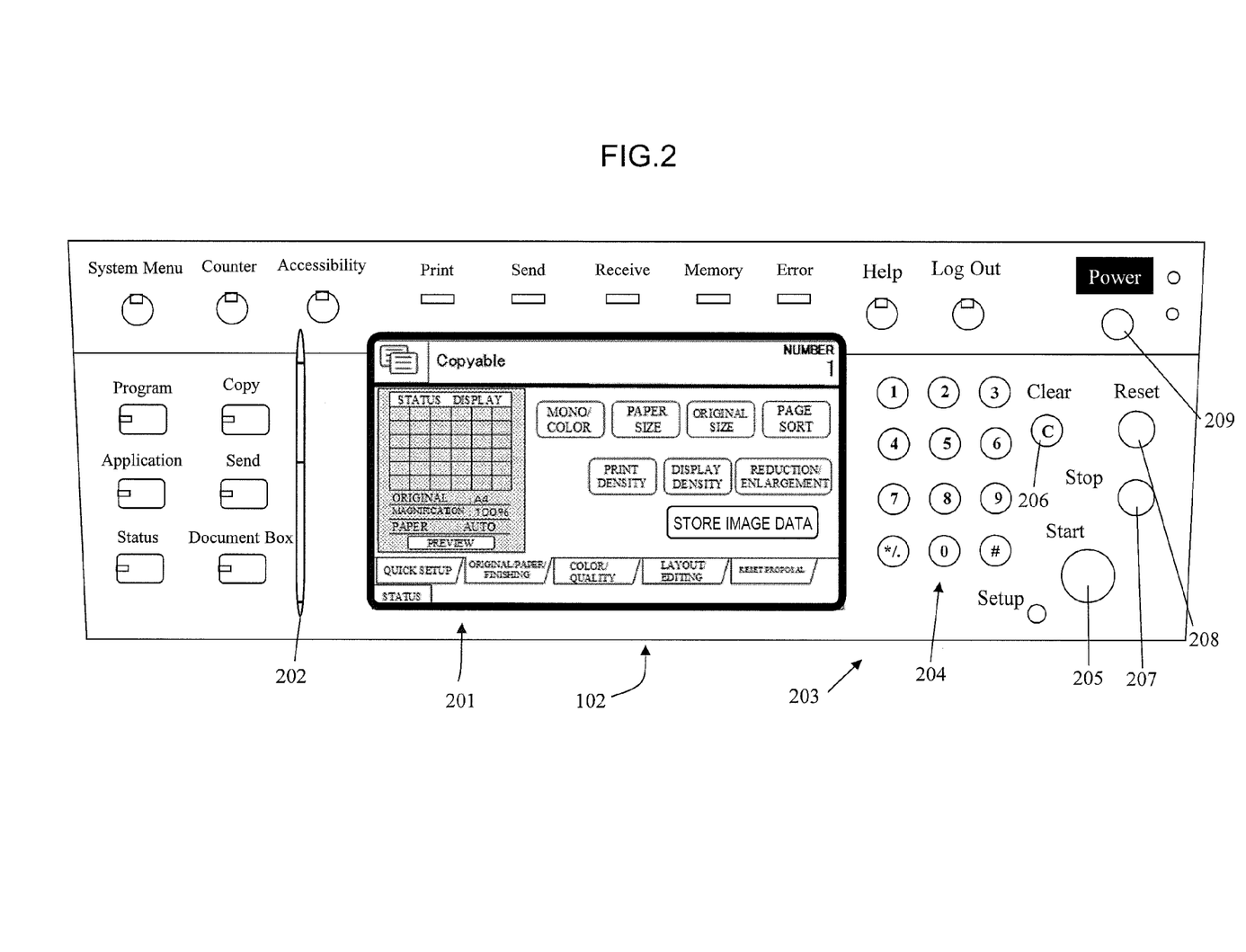
FIG. 2 is a conceptual diagram indicating a whole structure of an operation unit of a multifunction peripheral in accordance with an embodiment of the present disclosure.

As shown in FIG. 2, the user inputs the setting conditions of the image processing with respect to the above image processing and confirms the inputted setting conditions by means of the operation unit 102. At inputting the setting condition, the user uses a touch panel 201 (an operation panel), a touch pen 202, and an operation key 203 that are provided to the operation unit 102.

The touch panel 201 includes both the setting condition input function and the setting condition displaying function. That is, when the user presses down the key on the screen displayed on the touch panel 201, the setting condition corresponding to the pressed key is inputted.

A display unit (not shown) such as LCD (Liquid Crystal Display) is provided on a back of the touch panel 201. The display unit displays an operation screen, such as an initial screen, for example. The touch pen 202 is provided nearby the touch panel 201. When the user contacts the touch panel 201 with a tip of the touch pen 202, a sensor under the touch panel 201 detects the contact of the tip.

Nearby the touch panel 201, a specific number of operation keys 203 are arranged, such as a ten key 204, a start key 205, a clear key 206, a stop key 207, a reset key 208, and a power key 209, for example.

Figure 3:
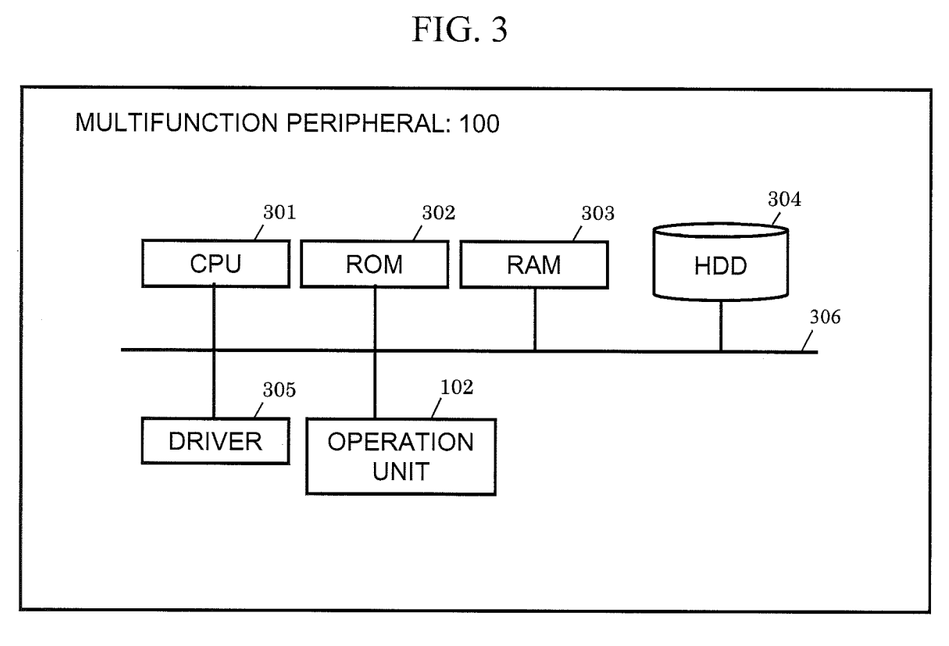
FIG. 3 is a diagram indicating a structure of control system hardware of a multifunction peripheral in accordance with an embodiment of the present disclosure.

According to FIG. 3, a structure of the control system hardware of the multifunction peripheral 100 is explained here. The parts that do not have direct relation to the present disclosure are explained briefly, and the detailed explanation is omitted.

A control circuit of the multifunction peripheral 100 of the image processing system 1 is configured to connect a CPU (Central Processing Unit) 301, a ROM (Read Only Memory) 302, a RAM (Random Access Memory) 303, a HDD (Hard Disk Drive) 304, a driver 305 corresponding to each driving unit, and the operation unit 102 through an internal bus 306.

The CPU 301 uses the RAM 303 as a working area, for example, and executes programs stored in the ROM 302 and the HDD 304. The CPU 301 receives and sends data, instructions, signals, and commands from the driver 305 and the operation unit 102, according to the execution result, and controls the operation of each driving unit shown in FIG. 1.

The functions of respective units (shown in FIG. 4) described later except the driving unit are materialized by executing each program by the CPU 301 of the multifunction peripheral 100. The ROM 302, the RAM 303 and the HDD 304 store the program and data for materializing the undermentioned units.

Embodiments of the Present Disclosure

Figure 4:
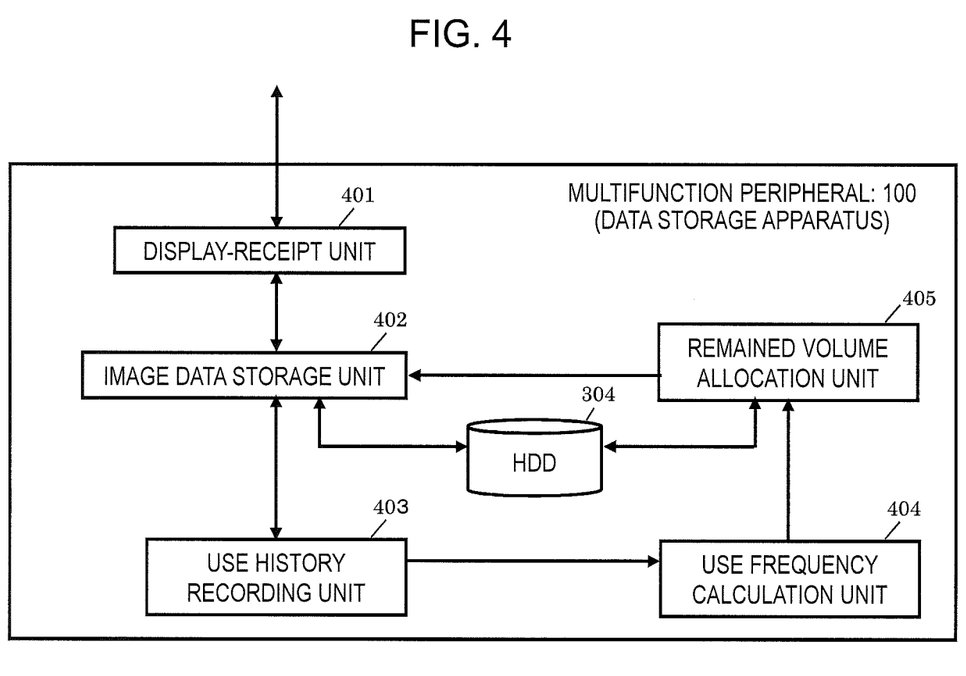
FIG. 4 is a functional block diagram of a multifunction peripheral in accordance with an embodiment of the present disclosure.

The structure and execution procedure in the embodiments of the present disclosure are explained with reference to FIG. 4 and FIG. 5.

When the user powers on the multifunction peripheral 100, a display-receipt unit of the multifunction peripheral 100 is activated and displays a log-in screen on the touch panel 201.

The user inputs his ID (e.g. "user A") and password (e.g. "AAA") according to the log-in screen. When the inputted user ID and password are identical with a registered user ID and a registered password in the multifunction peripheral 100 respectively, the display-receipt unit 401 displays the operation screen indicating each function of the multifunction peripheral 100 on the touch panel 201.

The user selects an image data storage function on the operation screen, for example, as shown in FIG. 2, and then the display-receipt unit 401 notifies an image data storage unit 402 that the user A selects the image data storage function. Upon receipt of the notice, the image data storage unit 402 confirms a memory volume available to the log-in user A (a remained user memory capacity) in the HDD 304 to store the image data.

Here, it is assumed that a total memory volume of the HDD 304 for storing the image data is 100 GB, and the number of users allowed to use the memory is three. The total memory volume 100 GB is divided according to the user's access level, namely, 30 GB is for the user A, 20 GB is for the user B, 20 GB is for the user C, and the remained 30 GB is for a free space to be used by everyone. The memory space for storing the image data has been allocated for each user in such manner at the initial setting. The memory space future available to the user A is determined according to a state of current use of the memory volume for every user.

When the memory space available to the user A does not remain in the HDD 304, the image data storage unit 402 displays a screen for the user A indicating that the image data storage function cannot be used, and the screen goes back to the operation screen.

On the other hand, when the memory space available to the user A remains, the image data storage unit 402 displays on the touch panel 201 an input screen indicating the steps for storing the image data.

The user A places an original on the original plate 101 according to the input screen, and presses down an image data storage key on the screen. The image reading unit 103 reads the original on the original plate 101, and the image data storage unit 402 stores image data corresponding to the read image in the memory space allocated to the user A in the HDD 304 (FIG. 5, S101).

When the image data is stored in the memory space of the user A, the image data storage unit 402 notifies a use history recording unit 403 that the image data is stored. Upon receipt of the notice, the use history recording unit 403 records a use history of the memory space allocated to the user as the state of use, whenever the user stores the image data in the memory space allocated to the user (FIG. 5, S102).

The recording method of the use history is not limited in particular, but it may be executed as follows in the present embodiment. Specifically, when a specific user stores the image data in the memory space allocated to the specific user, the use history recording unit 403 updates values of items 601 indicating the use state of the memory space for the specific user, namely, a stored data volume (GB), (data) writing times (frequency), (data) reading times (frequency) and (data) reference times (frequency). Here, the stored data volume is a sum of the volumes of all the image data stored in the memory space for the specific user, the writing times is the number of times that the specific user writes (stores) the image data in the memory space for the specific user, the reading times is the number of times that the specific user uses (reads) the image data from the memory space for the specific user, and the reference times is the number of times that the specific user references to the memory space of the specific user (how many times the specific user uses the image data storage function).

Figure 6A:
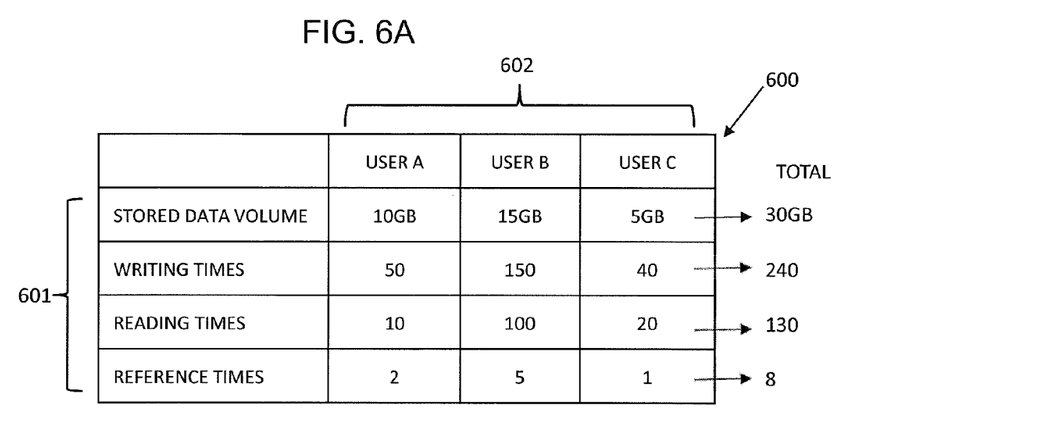
FIG. 6A is a diagram indicating an example of a history table in accordance with an embodiment of the present disclosure.

The use history recording unit 403 stores each value of the items 601 indicating the use states of the respective memory spaces in a specific history table 600, the values being associated with the users 602 respectively, as shown in FIG. 6A. Specifically, when the user A uses the image data function and stores the image data in the memory space for the user A, the values of the history table 600 are updated as shown in FIG. 6A. The stored data volume of the user A becomes 10 GB by adding the data volume to be stored in the memory space for the user A. The number of writing times to the memory space for the user A is added with "1", and becomes "50". But the number of reading times from the memory space for the user A remains "10". The number of reference times to the memory space for the user A is added with "1", because the user A refers to the memory space for the user A, and it becomes "2".

Figure 5:
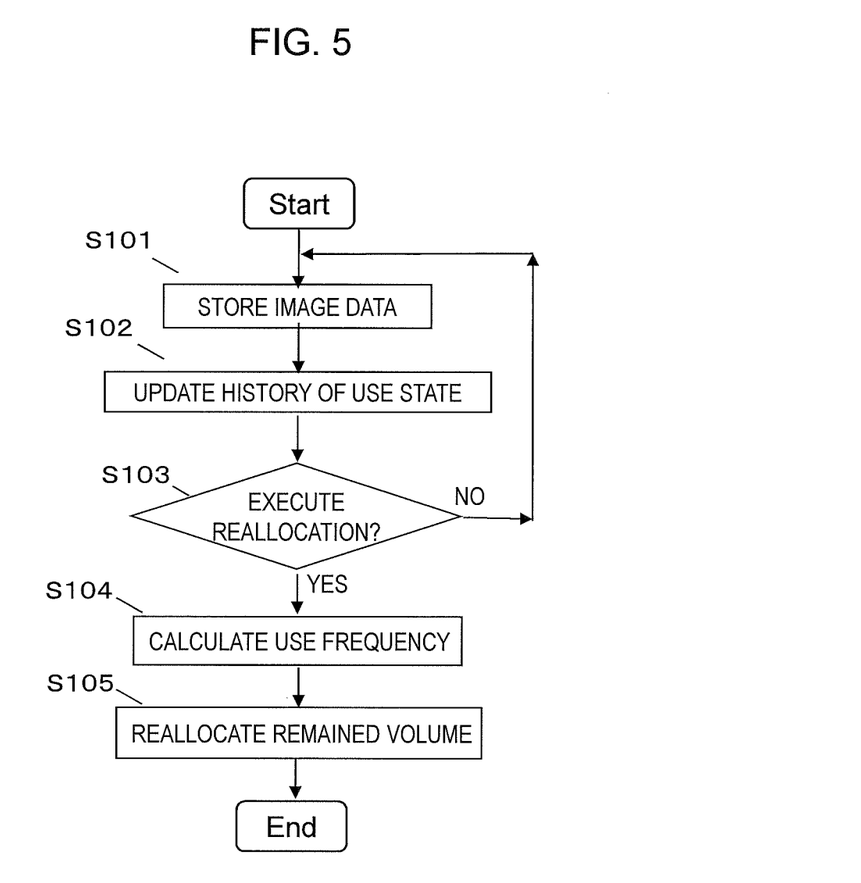
FIG. 5 is a flowchart indicating an execution procedure of a multifunction peripheral in accordance with an embodiment of the present disclosure.

After updating the state of use, the use history recording unit 403 determines whether or not the reallocation of the memory space of the HDD 304 is executed (FIG. 5: S103).

The method of reallocating the memory space is not limited in particular, but it may be executed as follows. When a specific time (for example, a few days, a week, and so on) has passed after the allocation of the memory space was executed, or when the specific user or an administrator instructs the execution of the reallocation of the memory space by a specific key, the use history recording unit 403 determines that the memory space is reallocated.

According to the determination result, when the reallocation of the memory space is not executed (FIG. 5: S103 NO), the step returns to S101. When another user (not the user A) uses the image data storage function (FIG. 5: S101), the user history recording unit 403 updates the use history of the memory space for the other user (FIG. 5: S102). As described above, whenever the user stores the image data, the values of the items 601 in the history table 600, indicating the use state of the memory space, are updated for every user 602.

On the other hand, when the reallocation of the memory space is executed (FIG. 5: S103 YES), the use history recording unit 403 notifies a use frequency calculation unit 404 of the execution of the reallocation. Upon receipt of the notice, the use frequency calculation unit 404 calculates the frequencies of use of the memory spaces for every user according to the use histories of the memory spaces (FIG. 5: S104).

The method of calculating the frequencies of use of the memory spaces for every user is not limited in particular, but it may be executed as follows in the present embodiment. The use frequency calculation unit 404 refers to the history table 600, and calculates a proportion of the use state of the specific user 602 to the use states of all the users 602.

Specifically, as shown in FIG. 6A, the use frequency calculation unit 404 calculates a sum of all the stored data volume for every user, 10 GB+15 GB+5 GB, and finds "30 GB" as a total of the stored data volumes. A sum of all the number of writing times for every user, 50+150+40, is calculated, and "240" is found as a total of writing times. A sum of all the number of the reading times for every user, 10+100+20, is calculated, and "130" is found as a total of reading times. A sum of all the number of the reference times for every user, 2+5+1, is calculated, and "8" is found as a total of reference times.

Figure 6B:
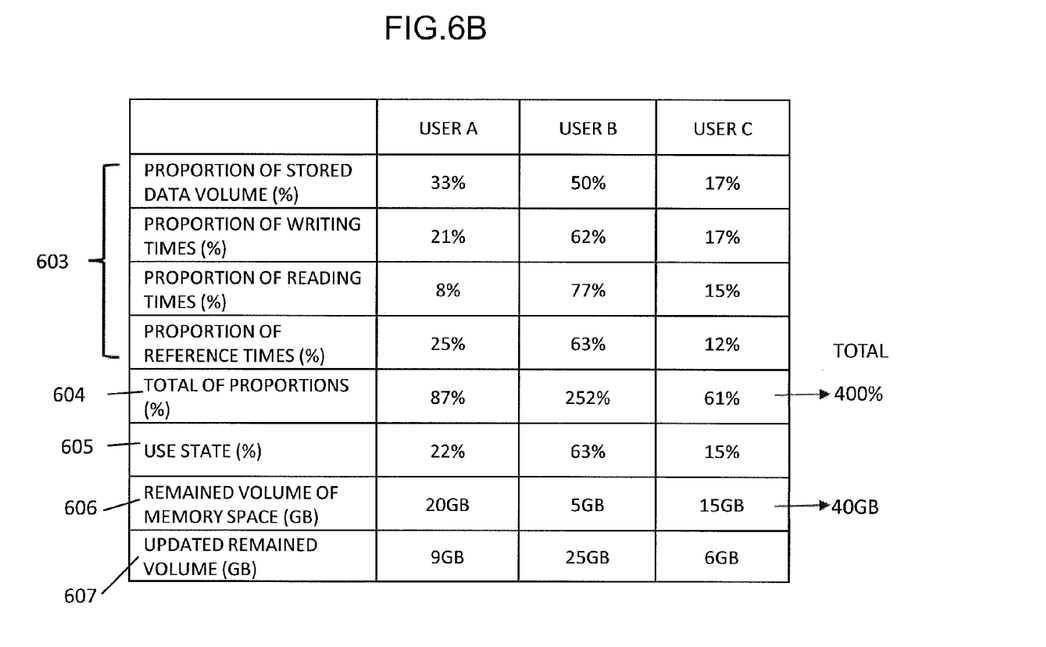
FIG. 6B is a diagram indicating an example of a frequency of use and a remained volume in a memory space in accordance with an embodiment of the present disclosure.

The use frequency calculation unit 404 divides each value of the items 601 for every user by the sums for every item respectively, and a proportion of the use state (%) of the user is calculated for every item. For instance, as shown in FIG. 6B, the use frequency calculation unit 404 divides "10 GB" indicating the stored data volume of the memory space for the user A by "30 GB" indicating the total of the stored data volumes, and 33% is found as a proportion of the stored data volume (%) of the user A. "50" indicating the writing times of the user A is divided by "240" indicating the total of the writing times, and 21% is found as a proportion of the writing times (%) for the user A. "10" indicating the reading times of the user A is divided by "130" indicating the total of the reading times, and 8% is found as a proportion of the reading times (%) for the user A. "2" indicating the reference times of the user A is divided by "8" indicating the total of the reference times, and 25% is found as a proportion of the reference times (%) for the user A. Subsequently, the use frequency calculation unit 404 executes the above steps for the user B and the use C.

In addition, the use frequency calculation unit 404 calculates a sum of all the proportions (%) of the items 603 for the specific user, and finds the sum as a total of the proportions (%) 604, as shown in FIG. 6B. For instance, in case of the memory space for the user A, the use frequency calculation unit 404 calculates the sum of the proportion (%) of "33%" indicating the stored data volume, "21%" indicating the proportion of the writing times, "8%" indicating the proportion of the reading times and "25%" indicating the proportion of the reference times, and "87%" is found as a total of proportions (%) 604. Subsequently, the use frequency calculation unit 404 executes the above steps for the user B and the use C.

Moreover, the use frequency calculation unit 404 sums up all of the total of proportions (%) 604, and finds "400%" as a grand total of proportions. The total of proportions (%) 604 for every user is divided by "400%" indicating the grand total of proportions, and a quotient thus calculated is defined as a proportion of the use state (%) 605 for every user. For instance, in case of the user A, the total of proportion "87%" is divided by 400%, and "22%" is found as the proportion of the use state (%) 605 of the user A. Subsequently, the use frequency calculation unit 404 executes the above steps for the user B and the use C.

Accordingly, it is possible to calculate the proportion of the use state (%) of the user where the use state regarding all the items 601 are taken into consideration. The proportion of the use state of the user means the use frequency of the memory space allocated to the user.

The use frequency calculation unit 404 is configured to simply sum up the proportions of items (%) 603 for the specific user and find the total of the proportions (%) 604 for the specific user, but the method of calculating the total of the proportions (%) 604 is not limited to this. For instance, in case where a specific item of the items 601 has high importance, all of the proportions of items (%) 603 may be summed up after the proportion of the specific item 603 is multiplied by a first coefficient more than 1 in order to give large influence on the user frequency. In case where a specific item of the items 601 has small importance, all of the proportions of items (%) 603 may be summed up after the proportion of the specific item 603 is multiplied by a first coefficient less than 1 in order to reduce the influence on the user frequency.

The use frequency calculation unit 404 completes the calculation of the use frequency of the memory space for every user, and then notifies a remained volume allocation unit 405 of a notice of the calculation result. Upon receipt of the notice, the remained volume allocation unit 405 reallocates the remained volume of the memory space in the HDD to the users according to the use frequency of each user (FIG. 5: S105), so as to allocate a larger volume of the remained space for a heavy user.

The method of allocating the remained volume of the memory space in the memory device is not limited in particular, but it may be executed as follows. The remained volume allocation unit 405 calculates a remained volume for every user 606 as shown in FIG. 6B. In case of the user A, since the memory volume currently used (the stored data volume) is "10 GB" and the memory space available for the user A, which was allocated at the initial setting, is "30 GB", the remained volume allocation unit 405 subtracts "10 GB" from "30 GB", and finds "20 GB" as the remained volume (GB) for the user A. The remained volume allocation unit 405 executes the above steps for the user B and the use C.

Next, the remained volume allocation unit 405 sums up all of the remained volume (GB) 606 for every user, and finds "40 GB" as a total of remained volumes (GB) in the HDD. The remained volume allocation unit 405 multiplies "40 GB" indicating the total of remained volumes (GB) by the proportion of the use state (%) of the user 605, and a product (GB) thus found is reallocated to the user as an updated remained volume for the user 607 (the remained volume that is updated after the reallocation). In case of the user A, since the proportion of the use state (%) 605 is 22% and the total of remained volumes is 40 GB, the product when 40 GB is multiplied by 22% is 9 GB, and 9 GB is reallocated to the user A as the updated remained volume 607. The remained volume allocation unit 405 executes the above steps for the user B and the user C. Hereby, it is possible to reallocate a larger remained memory volume for the heavy user. For instance, since the use frequency of the user A is low, "9 GB" is reallocated for the user A as the updated remained volume, though it is smaller than the remained volume "20 GB" of the space originally allocated at the initial setting. In case of the user B, since he is the heavy user, "25 GB" is reallocated for the user B as the updated remained volume, and it is larger than the remained volume "5 GB" of the space originally allocated at the initial setting.

According to the above configuration, the remained memory volume can be reallocated to the users according to the use state of the user, that is, a larger remained memory volume is reallocated for the heavy user, and the limited memory space of the HDD 304 can be used effectively.

In the above description, the remained volume allocation unit 405 is configured to sum up all of the remained volume for every user (GB) 606 and find the total of remained volumes (GB), but it may be configured in a different manner. For instance, since the HDD 304 includes the free space as described above, the volume of the free space may be used at the reallocation of the total remained volume. The remained volume allocation unit 405 adds the volume of the free space (30 GB) to the total of the remained volumes for the users, 20 GB+5 GB+15 GB, the total of the remained volumes available to the users may be found as "70 GB". Therefore, it is possible to reallocate the remained memory volume to the users, so as to reallocate the larger volume to the heavy user.

The remained volume allocation unit 405 ends the reallocation of the updated remained volumes to respective users, and then notifies the image data storage unit 402 of the end of the reallocation. Upon receipt of the notice, the image data storage unit 402 provides the users with the image data storage function according to the reallocated remained volume of the memory space for every user.

As described above, in the present disclosure, when the image processing apparatus has the memory device shared by the plural users, it is possible to effectively allocate the memory space available for every user.

In the embodiments of the present disclosure, the explanation refers to a case where the multifunction peripheral 100 storing the image data is applied to the data storage apparatus, however, the image data apparatus may be any apparatus if it can store the image data. For instance, whenever the present invention is applied to any image forming apparatus, any image processing apparatus, any image displaying apparatus, any data processing apparatus, or any terminal device, it is possible to provide the same effect as the embodiments of the present In the embodiments of the present disclosure, the data storage device stores the image data, however, since the present disclosure takes a view of the remained memory volume of the storage device, the data storage apparatus has nothing to do with the kind of image data. In case of using the other kind of data, it is possible to provide the same effect as the embodiments of the present disclosure.

In the embodiment of the present disclosure, the memory space to be allocated exists in the HDD 304, but the memory space may be in the other storage unit, like the ROM 302.

In the embodiments of the present disclosure, the data storage apparatus (the multifunction peripheral 100) is configured to include each unit, but it may be configured by providing with the storage medium storing the program realizing the respective units. In such configuration, the program is read onto the data storage apparatus, and the data storage apparatus realizes the respective units. In this case, the program read from the storage medium can provide with the same effect as the present disclosure. In addition, it is possible to provide with the method for storing the steps executed by each unit in the hard disk.

What is claimed is:

1. A data storage apparatus including a memory device shared by plural users comprising:
 a use history recording unit configured to record a use history of a memory space in a history table when a user accesses to the memory space allocated to the user, regarding items combining a stored data volume in the memory space allocated to the user with at least one item of the number of writing times that the user writes data in the memory space, the number of reading times that the user reads the data from the memory space, and the number of reference times that the user logs in the data storage apparatus and executes a data storage function;
 a use frequency calculation unit configured to find a use frequency of the memory space by calculating a proportion of use state of the memory space based on values recorded in the history table; and
 a remained volume allocation unit configured to reallocate a remained memory volume based on the use frequency, wherein, when a specific time passes after a last allocation of the memory space or when a specific user instructs the reallocation, after the use history recording unit updates the use history of the memory space, the use frequency calculation unit finds the use frequency of the memory space.

2. The data storage apparatus according to claim 1, wherein the use frequency calculation unit calculates proportions of items with respect to each item indicating the use history recorded in the history table, and calculates a proportion of use state for each user as a use frequency based on a total of the proportions of items thus calculated and a grand total of the proportions.

3. The data storage apparatus according to claim 1, wherein the use frequency calculation unit calculates proportions of items with respect to each item indicating the use history recorded in the history table, and in case where a specific item has high importance, sums up all of the proportions of items after the proportion of the specific item is multiplied by a first coefficient more than 1, in case of where a specific item has small importance, sums up all of the proportions of items after the proportion of the specific item is multiplied by a second coefficient less than 1, and calculates a proportion of use state for each user as a use frequency based on a total of the proportions of items thus calculated and a grand total of the proportions.

4. The data storage apparatus according to claim 1, wherein the remained volume allocation unit sums up all the memory volumes remained in each memory space of user, and reallocates, as an updated remained memory volume, a value when a total of remained memory volumes is multiplied by the proportion of the use state indicating the use frequency calculated by the use frequency calculation unit for each user.

5. The data storage apparatus according to claim 1, wherein the remained volume allocation unit sums up all the memory volumes remained in each memory space for user and a volume remained in a free space, and reallocates, as an updated remained memory volume, a value when a total of remained memory volumes is multiplied by the proportion of the use state indicating the use frequency calculated by the use frequency calculation unit for each user.

* * * * *